United States Patent
Midmore

(10) Patent No.: US 12,542,071 B2
(45) Date of Patent: *Feb. 3, 2026

(54) TAILORED INTERACTIVE LEARNING SYSTEM USING A FOUR-VALUED LOGIC

(71) Applicant: Roger Midmore, Calistoga, CA (US)

(72) Inventor: Roger Midmore, Calistoga, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/894,820

(22) Filed: Jun. 7, 2020

(65) Prior Publication Data

US 2020/0302827 A1    Sep. 24, 2020

Related U.S. Application Data

(63) Continuation of application No. 15/588,469, filed on May 5, 2017, now Pat. No. 10,706,741, which is a continuation-in-part of application No. 14/095,416, filed on Dec. 3, 2013, now Pat. No. 9,672,466, which is a continuation-in-part of application No. 14/051,722, filed on Oct. 11, 2013, now Pat. No. 9,576,319, which is a continuation-in-part of application No. 14/016,538, filed on Sep. 3, 2013, now Pat. No. 9,575,951, which is a continuation-in-part of application No. 14/016,518, filed on Sep. 3, 2013, now Pat. No. 9,576,244.

(51) Int. Cl.
| | |
|---|---|
| *G06N 5/022* | (2023.01) |
| *G06F 3/01* | (2006.01) |
| *G06F 40/30* | (2020.01) |
| *G06F 40/56* | (2020.01) |
| *G09B 5/06* | (2006.01) |
| *G09B 19/06* | (2006.01) |

(52) U.S. Cl.
CPC ............ *G09B 19/06* (2013.01); *G06F 3/017* (2013.01); *G06F 40/30* (2020.01); *G06F 40/56* (2020.01); *G06N 5/022* (2013.01); *G09B 5/065* (2013.01)

(58) Field of Classification Search
None
See application file for complete search history.

(56) References Cited

U.S. PATENT DOCUMENTS 10,706,741 B2 * 7/2020 Midmore ............... G06N 5/022
10,861,344 B2 * 12/2020 Smith Lewis ......... G09B 5/125

OTHER PUBLICATIONS

Schwartz et al, "Dynamic Language Learning Tools", Jun. 2004, Proceedings of InSTIL/ICALL2004—NLP and Speech Technologies in Advanced Language Learning Systems, all pages (Year: 2004).*

* cited by examiner

*Primary Examiner* — Daniel C Puentes

(57) ABSTRACT

A tailored interactive language learning system that teaches an individualized set of vocabulary words to users through interactive avatars and stories. The interaction is modeled through probabilistic rules in a semantic network and neural network having objects and relations. Dialog and narration is generated dynamically based on the state of the interactive story model using phrasal rewrite rules and neural network implementing a four-valued logic system in which truth values of the objects and relations are encoded as true, false, defined, and undefined in a single memory array.

16 Claims, 10 Drawing Sheets

Language Learning System
100

| Negation: | | | Conjunction: | | | | | | Disjunction: | | | | |
|---|---|---|---|---|---|---|---|---|---|---|---|---|---|
|  | | | ∧ | F | T | U | D | | ∨ | F | T | U | D |
| F | T | | F | F | F | F | F | | F | F | T | U | D |
| T | F | | T | F | T | U | D | | T | T | T | T | T |
| U | D | | U | F | U | U | F | | U | U | T | U | T |
| D | U | | D | F | D | F | D | | D | D | T | T | D |
FIG. 5A       FIG. 5B      FIG. 5C
Three Element Triple 600
| Object 602 | Relation 604 | Object 602 |
|---|---|---|
FIG. 6A
Two Element Triple 600
| Object 602 | Relation 604 |
|---|---|
FIG. 6B

Index = 0                    Index = X                    Index = N

Four Valued Logic Mapped
Into a Single Array
700

Left Hand Side (Argument) → Right Hand Side (Inherited Arguments)

1. S( singular / plural ) → *NP VP // O-R

2. NP( singular / plural / animate / human ) → *NP RelPN VP // O-R

3. NP( singular / plural / +determiner / human ) → Det *NP // O

4. VP( -passive ) → *VP NP // R-O

5. NP( -determiner / attribute ) → adj *NP // O

FIG. 10

1. *NP VP // [1( singular/plural ) 2( ) → 1( singular/plural ) 2( singular/plural )]

2. *NP RelPN VP // [1( singular/plural/animate/human ) 2( ) 3( ) → 1( singular/plural/animate/human ) 2( singular/plural/animate/human ) 3( singular/plural )]

3. Det *NP(-determiner) // [1( ) 2( singular/plural/+determiner/specifier ) → 1( singular/plural/+determiner ) 2( singular/plural/+determiner/specifier )]

4. *VP NP // [1( ) 2( ) → 1( ) 2( )]

5. adj *NP // [1( ) 2( attribute ) → 1( attribute) 2( attribute )]

FIG. 11

$$C = (A\beta\gamma\delta\varepsilon)/(A) + (ABCDE)/(A)$$

1301

Example of the Vocabulary Ratio *C* with Random Partitioning set to five

FIG. 13

TAILORED INTERACTIVE LEARNING SYSTEM USING A FOUR-VALUED LOGIC

CLAIM OF PRIORITY

This application is a continuation-in-part of U.S. patent application Ser. No. 15/588,469, filed May 5, 2017, which was a continuation-in-part of: U.S. patent application Ser. No. 14/095,416, now U.S. Pat. No. 9,672,466, filed Dec. 3, 2013; U.S. patent application Ser. No. 14/051,722, now U.S. Pat. No. 9,576,319, filed Nov. 11, 2013; U.S. patent application Ser. No. 14/016,538, now U.S. Pat. No. 9,575,951, filed Sep. 3, 2013; and U.S. patent application Ser. No. 14/016,518, now U.S. Pat. No. 9,576,244, filed Sep. 3, 2013, the complete contents of which are incorporated herein by reference.

BACKGROUND

Field of the Invention

The present disclosure relates to the field of language instruction, particularly a system for teaching new vocabulary words to students for both primary and secondary language acquisition through interactive stories modeled with a Blackboard architecture implementing a semantic network in conjunction with a neural network implemented with a four-valued logic system.

Background

Language learning programs are valuable tools for teaching students new vocabulary words, or even entirely new languages. However, most existing programs teach the same words in the same ways to every student. For example, such teaching programs often teach from a predefined list of common vocabulary words. When they include audiovisual presentations, they are generally prerecorded or use the same script for each student.

Students, especially young children, often best learn through interactive scenarios. However, many existing programs are either entirely predefined or have limited options for students to interact with a presentation to ask questions or get more information about what they are seeing or hearing.

Moreover, most systems do not tailor the list of words being taught to the specific academic level of each student. This can limit a student's understanding of the target language. For example, teaching only from a fixed list of the most common words in a target language can lead to the student not understanding less common words that are more representative of how the language is used in practice, because fluent speakers of a language do not limit themselves to only the most common words in that language.

What is needed is a language learning system that presents interactive stories, including the new words to be learnt, in a way to optimize the learning for the student. The system should present interactive dialogue to students using a vocabulary list that is individualized for each student. The interactive story should be modeled in a semantic network, and neural network using a four-valued logic system so when dialog is generated or when students ask questions about the story the system can generate cogent answer.

BRIEF DESCRIPTION OF THE DRAWINGS

FIG. 5A depicts a logic table for a negation operation in a four-valued logic system.

FIG. 5B depicts a logic table for a conjunction operation in the four-valued logic system.

FIG. 5C depicts a logic table for a disjunction operation in the four-valued logic system.

FIG. 6A depicts a 3-element data triple in a semantic network.

FIG. 6B depicts a 2-element data triple in a semantic network.

FIG. 10 depicts an exemplary embodiment of a list of phrasal rewrite rules that can be used to generate a sentence in the target language based on an input argument triple.

FIG. 11 depicts examples of feature distribution among units on the right hand side of various exemplary phrasal rewrite rules.

FIG. 13 depicts a non-limiting example of the vocabulary ration C, from page 324 of Gustav Herdan's *The Advanced Theory Of Language As Choice Or Chance*, with the random partitioning function set to five.

DETAILED DESCRIPTION

Figure 1:
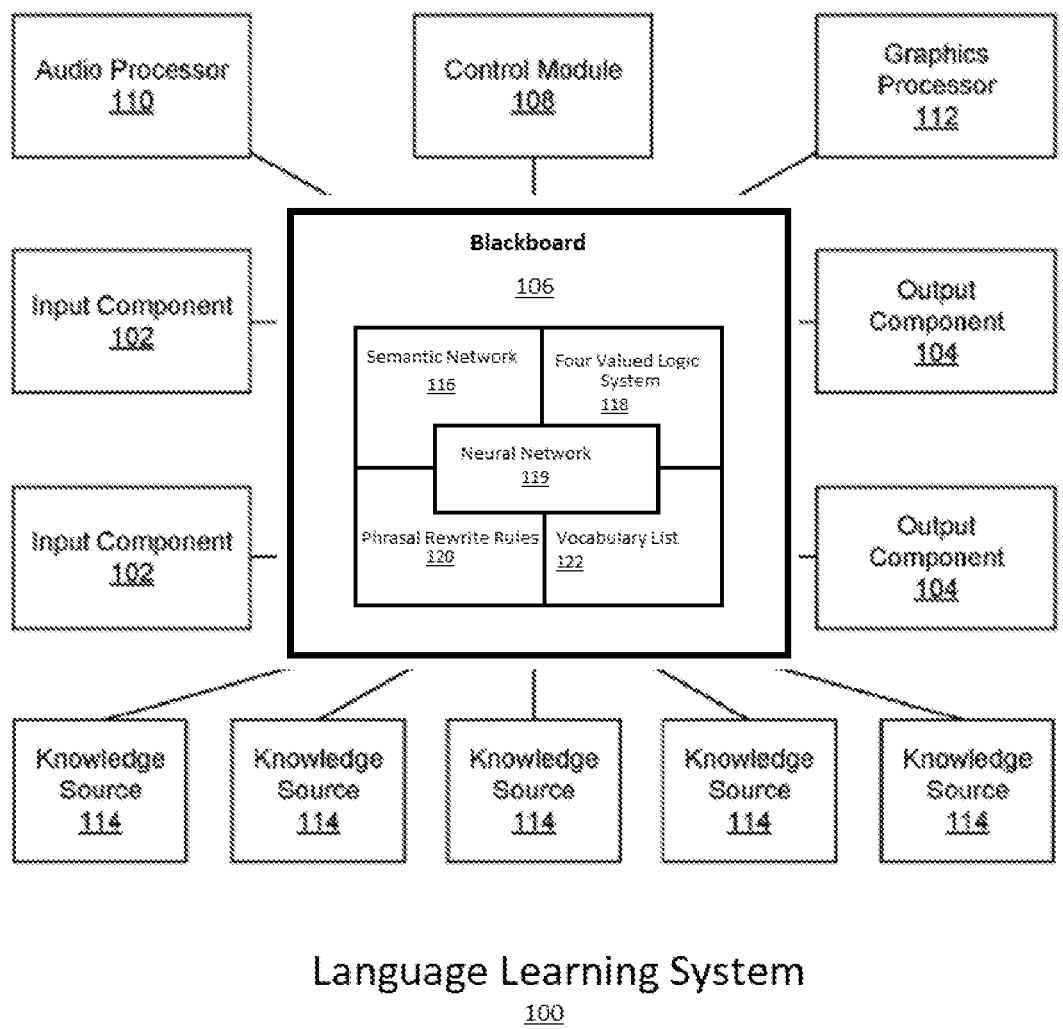
FIG. 1 depicts an embodiment of a language learning system.

FIG. 1 depicts an embodiment of a language learning system 100. The language learning system 100 can present a dynamically generated interactive story to a user through audio and/or visuals that can teach vocabulary words to the user.

The language learning system 100 can comprise one or more input components 102, one or more output components 104, and a processing system comprising a blackboard 106, a control module 108, an audio processor 110, a graphics processor 112, and one or more knowledge sources 114. The blackboard 106 can be a database or other central memory location that is accessible by the other components of the language learning system 100.

The input components 102 can be elements through which a user can input data into the blackboard 106, such as cameras, microphones, touchscreens, keyboards, mice, or any other elements for inputting images, audio, or other data into the blackboard 106. By way of a non-limiting example the language learning system 100 can comprise a camera that can take images and/or video of a user as the user interacts with the language learning system 100, and/or a microphone that can record audio of words spoken by the user.

The output components 104 can be elements through which a user can perceive images and/or audio generated by the language learning system 100, such as visual displays and speakers. In some embodiments an output component 104 for generated images can be a projector, such as a two dimensional or stereoscopic 3D projector. In other embodiments an output component 104 for generated images can be a holographic display, a 3D television or monitor, a 2D television or monitor, an augmented and/or virtual reality headset, or any other type of display or connection to an external display.

In some embodiments the visuals can be presented through an output component 104 that makes the visuals appear immersive to the user, which can increase the chances of the user engaging with the interactive story and accordingly better learning the language being taught. While in some embodiments immersive visuals can be presented through a virtual reality headset or other head-mounted display, in other embodiments a holographic display, 3D television, or 3D projector can present immersive visuals to the user. By way of a non-limiting example, some virtual reality headsets have age restrictions or guidelines, and as such in some embodiments the language learning system can use a 3D projector to present the interactive story to young children through immersive visuals.

In embodiments in which an output component 104 is a stereoscopic 3D projector, one image can be projected for a viewer's left eye while another image can be projected for a viewer's right eye. A viewer can wear corresponding 3D glasses, such as anaglyph, polarized, or shutter 3D glasses. The 3D glasses can block or filter light such that the projected left eye image is seen by the viewer's left eye and the projected right eye image is seen by the viewer's right eye. When the left eye image and right eye image depict the same scene from different viewpoints that are spaced apart by a distance between human eyes, the viewer can perceive the scene three dimensionally.

The blackboard 106 can be centralized memory location that is accessible to the other components of the language learning system 100, such that the other components can add data to the blackboard 106, access data stored on the blackboard 106, and/or modify data stored on the blackboard 106. As will be discussed further below, the blackboard 106 can store data representing a semantic network 116 and/or neural network 119 and/or phrasal rewrite rules 120 to analyze or model data using a four-valued logic system 118. By way of a non-limiting example, the semantic network 116 and/or neural network 119 and/or phrasal rewrite rules 120 can model the state of an interactive story being presented by the language learning system 100, with the state of the interactive story being changed over time using the four-valued logic system 118.

The control module 108 can comprise one or more CPUs or other processors linked to the blackboard 106. The control module 108 can perform operations on data stored in the blackboard 106, and/or activate other components to perform such operations or contribute to the blackboard 106 as will be discussed further below.

One or more audio processors 110 can be linked to the blackboard 106. In some embodiments an audio processor 110 can be a dedicated audio card or processor, while in other embodiments an audio processor 110 can be a part of the control module 108, another CPU, or other processor.

An audio processor 110 can process existing audio data stored in the blackboard 106. By way of a non-limiting example, an audio processor 110 can process input audio data captured by a microphone or other input component 102 that has been stored in the blackboard 106, such as processing the input audio data for speech recognition as described below.

An audio processor 110 can also, or alternatively, generate new audio data for the interactive story. By way of a non-limiting example, the audio processor 110 can generate audio for a story character's speech, and/or mix generated audio with music, sound effects, or other audio being played for a story. In some embodiments audio generated by an audio processor 110 can be passed through the blackboard 106 to speakers for playback. In alternate embodiments the audio processor 110 can be directly linked to speakers such that generated audio can be played directly by the speakers.

One or more graphics processors 112 can be linked to the blackboard 106. In some embodiments a graphics processor 112 can be a dedicated graphics card or graphics processing unit (GPU), while in other embodiments a graphics processor 112 can be a part of the control module 108, another CPU, or other processor.

A graphics processor 112 can process graphics, images, visual data, or neural network stored in the blackboard 106. By way of a non-limiting example, a graphics processor 112 can process input images, such as still images or video of a user, captured by a camera or other input component 102.

A graphics processor 112 can also, or alternatively, generate new graphics, images, and/or other visual data for the interactive story. By way of a non-limiting example, a graphics processor 112 can generate visuals depicting the current state of a story. In some embodiments the graphics processor 112 can pass generated visuals through the blackboard 106 to a projector, screen, or other output components 104. In alternate embodiments the graphics processor 112 can be directly linked to output components 104 such that generated images are displayed directly.

One or more knowledge sources 114 can be linked to the blackboard 106 such that each knowledge source 114 can independently contribute to, modify, and/or draw from data stored at the blackboard 106. In some embodiments the language learning system's input components 102, output components 104, control module 108, audio processors 110, and/or graphics processors 112 can serve as knowledge sources 114, such that they can add data to the blackboard 106, modify data on the blackboard 106, or output data from the blackboard 106.

Figure 2:
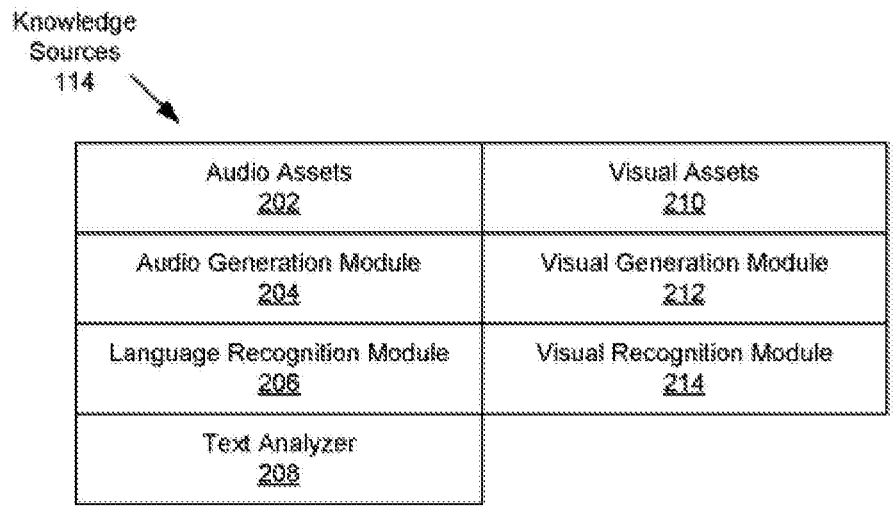
FIG. 2 depicts a non-limiting example of knowledge sources that can add data to a language learning system's blackboard, modify data on the blackboard, and/or access data stored on the blackboard.

FIG. 2 depicts a non-limiting example of knowledge sources 114 that can add data to the blackboard 106, modify data on the blackboard 106, and/or access data stored on the blackboard 106. Knowledge sources 114 can include audio assets 202, an audio generation module 204, a language recognition module 206, a text analyzer 208, visual assets 210, a visual generation module 212, and/or a visual recognition module 214.

Audio assets 202 can be used by an audio processor 110 or neural network 119 to generate audio for the interactive story. In some embodiments audio assets 202 can be pre-recorded sound samples of dialogue, sound effects, music, or other types of audio. In other embodiments audio assets 202 can be audio models or algorithms through which audio can be dynamically generated.

The audio generation module 204 can use the current state of an interactive story modeled in a semantic network 116, or neural network 119, along with corresponding audio assets 202, to generate audio for the interactive story. The audio generation module 204 can generate music and/or sound effects for the current scene, as well story narration or dialogue spoken by story characters. As will be discussed in more detail below, the audio generation module 204 can dynamically generate story narration of dialogue according to phrasal rewrite rules 120 and a vocabulary list 122, such that the words used in the story assist the user in learning new vocabulary words in a target language. In some embodiments the audio generation module 204 can be a part of an audio processor 110, while in other embodiments the audio generation module 204 can inform a separate audio processor 110 through the blackboard 106 about which sounds to generate and/or which audio assets 202 to use.

In some embodiments text associated with generated audio can be displayed via output components in addition to, or as an alternative to, playing back generated audio. By way of non-limiting examples, text such as subtitles, speech bubbles, or other text can be displayed along with, or instead of, playing back audible versions of the text.

The language recognition module 206 can use an acoustic Markov model or neural network 119 to recognize words in recorded audio data added to the blackboard 106 by an input component 102 such as a microphone. When words are recognized and added to the blackboard 106, other knowledge sources 114 can analyze the words to determine an appropriate response. By way of a non-limiting example, when a user asks a question about the interactive story, the language learning system 100 can pause the story to respond to the user's question. In some embodiments random partitioning can be applied to lower the number of bits per encoded word, which can improve the Markov model and neural networks 119 accuracy.

A text analyzer 208 can generate phrasal rewrite rules 120 and a vocabulary list 122 based on one or more text source files. The generated phrasal rewrite rules 120 and vocabulary list 122 can be used when presenting the interactive story with the language learning system 100, such as when the language learning system 100 generates sentences for narration or dialog.

In some embodiments the phrasal rewrite rules 120 and vocabulary list 122 generated by the text analyzer 208 can be stored on the blackboard 106. By way of non-limiting examples, each generated phrasal rewrite rule 120 and/or unique word in the generated vocabulary list 122 can be stored in the semantic network 116 or in other locations in the blackboard 106. In alternate embodiments, the phrasal rewrite rules 120 and/or vocabulary list 122 can be stored as separate knowledge sources 114.

Figure 3:
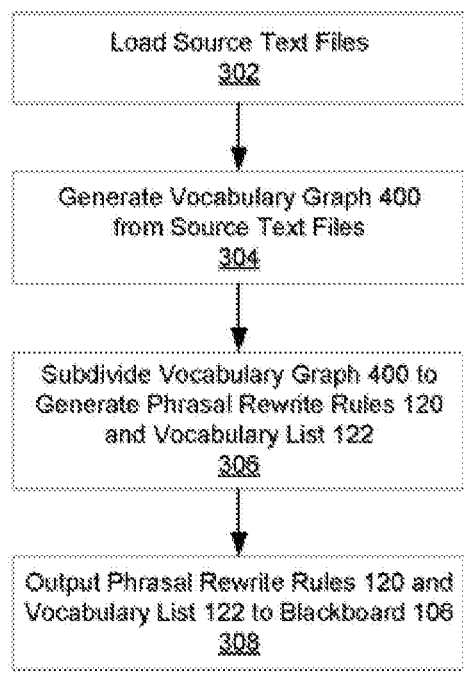
FIG. 3 depicts a non-limiting example of a process for generating a vocabulary list with a text analyzer.

FIG. 3 depicts a non-limiting example of a process for generating phrasal rewrite rules 120 and a vocabulary list 122 with the text analyzer 208.

At step 302, the text analyzer 208 can load one or more source text files into memory. Source text files can be books, articles, or any other type of source text. In some embodiments source text files can be selected based on content or genre, such that grammar and words derived from them for the phrasal rewrite rules 120 and vocabulary list 122 can be relevant to a particular educational topic or goal. As shown in FIG. 13 the text analyzer 208 may also use the vocabulary ratio C 1301 derived from the Random Partitioning Function to analyze the text files entered and then automatically search other data bases for similar texts of the same genre. The text analyzer 208 may use the Good-Turing frequency estimation of the repeat rate, or Gustav Herdan formulization of Yule's characteristic which is dual to the Good-Turing repeat rate, to automatically rate texts found to be in the same genre into degrees of vocabulary richness. Texts with a lower repeat rate of vocabulary being rated has having a richer vocabulary to sample from. The blackboard 106 may use the texts gathered by the text analyzer 208, the vocabulary ratio C 1301, and random partitioning function to train the neural network 119 for text generation.

Figure 4:
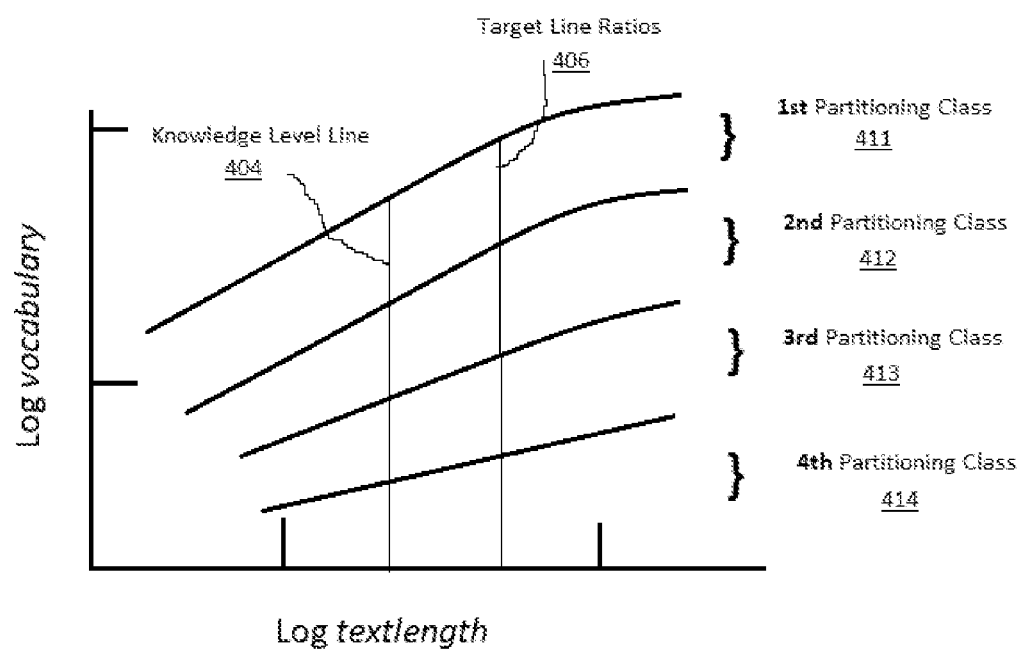
FIG. 4 depicts a non-limiting example of a graph depicting the Heap-Herdan law constructed from the classes created from the random partitioning function.

At step 304, the text analyzer 208 can generate a vocabulary graph 400 from the source text files. The text analyzer 208 can generate a list of words found in the source text files, and use the Good-Turing frequency repeat rate, or Gustav Herdan's formalization of Yule's characteristic which is dual to the Good-Turing repeat rate, and Random Partitioning to generate statistical calibrated data from the source texts which take into account the different sample sizes of the texts and their semantic content. The text analyzer 208 can use that information to generate a vocabulary graph 400. As shown in FIG. 4, a vocabulary graph 400 built from the Random partitioning function can model the number words in a source text file against the length of the text source file, with the logarithm of the number of words on a first axis and the logarithm of the text length on a second axis.

At step 306, the text analyzer 208 can subdivide the vocabulary graph 400 into the student's knowledge level line 404 and target ratio line 406 along the logarithm of text length axis. Subdividing the vocabulary graph 400 along the logarithm of text length axis can correlate the student's knowledge level line 404 and vocabulary level, such that the student will be presented with a mix of words they already know along with new words to be included from the random partitioning classes in the ratios determined by the target line relation 406. The text analyzer 208 can estimate the student's overall knowledge level regarding the target language, based on previous interaction with the language learning system 100 or by administering a test similar to standardized tests used to computer verbal SAT scores. The estimate of the student's knowledge level can be used to establish a vertical knowledge level line 404 on the vocabulary graph 400 along the logarithm of text length axis, as shown in FIG. 4. The text analyzer 208 can also establish a vertical target line 406 on the graph to the right of the knowledge level line 404, The graph can then be used to take advantage of the Heap-Herdan law of vocabulary growth, using the ratio's provided by the Random partitioning function classes 411 412 413 414 at target line 406, to select classes of new vocabulary items that are in solidarity with one another and use this to present new vocabulary to the learner in an optimal way. The random partitioning ratios giving the number of words to be drawn from the random partitioning classes of text that haven't yet been included in the vocabulary list 122 already being presented to the user. The ratios are determined from the classes, which can be from any number from two to the total number of words in the text, generated by the Random Partitioning Function. By way of a non limiting example the four classes labelled 411, 412, 413, and 414 present an example of these ratios generated from a text partioned into four classes. Words from the target line area 406 are then incorporated in the vocabulary list 122.

The text analyzer 208 can also use the target ratio line 406 to find examples probabilities of grammar forms and use them and accompanying correlation data as paraphrasing input to generate or modify probabilistic phrasal rewrite rules 120 that are also tuned to the student's knowledge level. By way of a non-limiting example, existing phrasal rewrite rules 120 can be modified by reweighting probabilities for rules associated with the grammar forms based on frequency occurrences of new vocabulary words in the target vocabulary area 402. In some embodiments, existing phrasal rewrite rules 120 can be used when they cover the grammar forms found in the target line ratio 406, while new phrasal rewrite rules 120 can be generated when new grammar forms are found in the target line ratio 406.

At step 308, the text analyzer 208 can output the vocabulary list 122 generated from the text source files, as well as new or modified phrasal rewrite rules 120, to the blackboard 106 or as knowledge sources 114.

In alternate embodiments phrasal rewrite rules 120 and/or a vocabulary list 122 can be generated or modified in any other way, such as manually creating rules or a list of words, or identifying words that most frequently occur in one or more text source files.

Visual assets 210 can be used by a graphics processor 112 to render images for the interactive story. Visual assets 210 can be two dimensional images or 3D models of characters, items, settings, backgrounds, or other story elements. Visual assets 210 can also be animation files, fonts, or any other asset that can be used by a graphics processor 112 to generate images.

The visual generation module 212 can use the current state of an interactive story as modeled in a semantic network 116 and/or neural network 119, along with corresponding visual assets 210, to render images for the interactive story with a graphics processor 112. In some embodiments the visual generation module 212 can be a part of a graphics processor 112, while in other embodiments the visual generation module 212 can inform a separate graphics processor 112 through the blackboard 106 about which images to render and/or which visual assets 210 to use.

A visual recognition module 214 can use visual data captured by input components 102 to track a user's physical movements over time and identify gestures made by the user. By way of a non-limiting example, cameras can have captured 2D or stereoscopic still images, infrared data, or video frames of users, and the visual recognition module 214 can update a 3D model of the user over time based on captured visual data to identify the user's gestures. The visual recognition module 214 can also use generated story images stored on the blackboard 106 that are also being displayed via output components 104 in order to correlate identified gestures with the images being seen by the user. By way of a non-limiting example, the visual recognition module 214 can track a user's movements to identify when the user makes a pointing gesture, track the gesture's direction to identify an interest point at which the user is pointing, and review generated story images to determine what story objects are being displayed at that interest point, such that the visual recognition module 214 can identify a particular story object to which the user is pointing. In some embodiments the visual recognition module 214 can be a part of a graphics processor 112, while in other embodiments a visual recognition module 214 can use gesture data stored in the blackboard that was recognized by input components 102 and/or a separate graphics processor 112.

In some embodiments a visual recognition module 214 can additionally, or alternately, analyze a user's physical environment for visual cues when doing language recognition with the language recognition module 206. In some embodiments the visual recognition module 214 can recognize an object near the user, which can assist the language learning system 100 when interpreting the context of a user's statement or question.

In some embodiments the language learning system 100 can be self-contained within a unit such as a projector. By way of a non-limiting example, in some embodiments the components of the language learning system 100 shown in FIG. 1 can be housed within the body of a 3D projector. In other embodiments some components of the language learning system 100 can be in a separate device or enclosure, and be connected to an external display and/or speakers.

FIGS. 5A-C depict logic tables for logic operations used in the four-valued logic system 118. The language learning system 100 can use the four-valued logic system 118 to store and evaluate data within the blackboard 106, semantic network 116, neural network 199 and phrasal rewrite rules 120. In some embodiments, the four-valued logic system 118 can be used to evaluate propositional properties when modeling the interactive story. By way of a non-limiting example, the number of propositional properties used for realistic human character simulation can range from hundreds of thousands to millions, although fewer or more can be used in some embodiments for the interactive story presented by the language learning system 100. The propositional four-valued logic system 118 described herein is also capable of being used as a theorem prover.

The four-valued logic system 118 can be used to evaluate and operate on variables that have one of four possible values: true (T), false (F), defined (D), and undefined (U). By way of a non-limiting example, the four-valued logic system 118 can be used during conditional testing of propositional properties that specify variables as being true, false, defined, or undefined. Variables specified to have a defined value must be either true or false. Variables specified to have an undefined value can have any of the four truth values when conditional testing of propositional properties is performed. By way of a non-limiting example, undefined variables can have any of the four truth values during a phase state transition implemented through phrasal rewrite rules 120 as discussed below.

FIG. 5A depicts a logic table for a negation operation in the four-valued logic system 118, also known as a logical NOT (¬) operation. In the four-valued logic system 118: ¬F evaluates to T; ¬T evaluates to F; ¬U evaluates to D; and ¬D evaluates to U.

FIG. 5B depicts a logic table for a conjunction operation in the four-valued logic system 118, also known as a logical AND (∧) operation. In the four-valued logic system 118: F∧F evaluates to F; F∧T evaluates to F; F∧U evaluates to F; F∧D evaluates to F; T∧F evaluates to F; T∧T evaluates to T; T∧U evaluates to U; T∧D evaluates to D; U∧F evaluates to F; U∧T evaluates to U; U∧U evaluates to U; U∧D evaluates to F; D∧F evaluates to F; D∧T evaluates to D; D∧U evaluates to F; and D∧D evaluates to D.

FIG. 5C depicts a logic table for a disjunction operation in the four-valued logic system 118, also known as a logical OR (∨) operation. In the four-valued logic system 118: F∨F evaluates to F; F∨T evaluates to T; F∨U evaluates to U; F∨D evaluates to D; T∨F evaluates to T; T∨T evaluates to T; T∨U evaluates to T; T∨D evaluates to T; U∨F evaluates to U; U∨T evaluates to T; U∨U evaluates to U; U∨D evaluates to T; D∨F evaluates to D; D∨T evaluates to T; D∨U evaluates to T; and D∨D evaluates to D.

FIGS. 6A and 6B depict embodiments of data triples 600 that can be formed from data stored in the semantic network 116. A semantic network 116 can comprise objects 602 and relations 604. As shown in FIGS. 6A-6B, a triple 600 can comprise either two or three elements.

An object 602 can be a node in the semantic network 116. An object 602 can represent an entity such as a story character or item, a fundamental element such as the number zero, class data structures, or any other type of data. In some embodiments an object 602 can point to another object 602 or a triple 600 in the semantic network 116.

A relation 604 can represent an attribute of an object 602, a function that can be applied to other objects 602 and/or relations 604, or a relationship between two objects 602. By way of non-limiting examples, a relation 604 can be a function that operates on truth values associated with objects 602 or other relations 604, such as the logical operators of the four-valued logic system 118 described above with respect to FIGS. 5A-5C. While in some embodiments individual relations 604 can represent basic primary functions, more complex functions can be built by chaining together smaller functions.

Each object 602 or relation 604 in the semantic network 116 and/or neural network 119 can be associated with a plurality of truth values, such as truth values that indicate an object's attributes and/or relationship with other objects 602, or whether or not a function represented by a relation 604 can be applied to an object 602. The truth values can be the true, false, defined, and undefined values used in the four-valued logic system 118.

Figure 7:
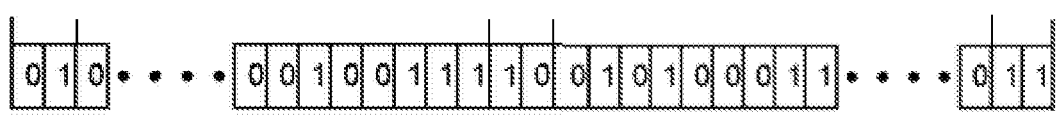
FIG. 7 depicts an example of encoding a plurality of truth values associated with a particular object or relation using a single memory array.

FIG. 7 depicts an example of encoding a plurality of truth values associated with a particular object 602 or relation 604 using a single memory array 700. The single memory array 700 can be defined for each object 602, and/or relation 604, and/or dat triples 600, with each memory array 700 having a plurality of index positions that are each two bits in size. The memory structures 700 can be arrays, vectors, lists, or any other similar data structure.

A particular truth value associated with an object 602 or relation 604 or triple 600 can be encoded using two bits in the memory array 700. As both bits can be either 0 or 1, four possible values corresponding to the four possible truth values used in the four-valued logic system 118 can be encoded at a particular index position. By way of a non-limiting example, in some embodiments a "0" in the first bit position in the memory array structure 700 and a "0" at the second bit position in memory array 700 can indicate a truth value of T, a "1" in the first bit position of the memory array 700 and a "1" at the second bit position in the memory array 700 can indicate a truth value of F, a "0" in the first bit position in the memory array 700 and a "1" at the second bit position in the memory array 700 can indicate a truth value of D, and a "1" in the first bit position in the memory array 700 and a "0" at the second bit position in the memory array 700 can indicate a truth value of U. Multiple bit positions in the memory array 700 can be combined to form scalar variables or the bits for floating point computations. In some embodiments the size of the memory array 700 can be limited by word size or memory restrictions in computer architecture, which can introduce a chunking factor in theoretic run time computations of the system.

Returning to FIG. 6A, in some embodiments a three element triple 600 can comprise two objects 602 and a relation 604. Accordingly, in some cases a three element triple 600 can represent a particular relationship between a subject object 602 and another object 602 in the semantic network 116 and/or neural network 119 based on the relation 604.

By way of a non-limiting example, when the triple's first object 602 represents a story character named "Bob," the triple's second object 602 represents a dog character in the story, and the triple's relation 604 indicates that the first object 602 "likes" the second object 602, the three element triple 600 would indicate that Bob likes the dog. Another three element triple 600 in the semantic network 116 could have these two objects 602 reversed with the same or different relation 604 so that the triple 600 could indicate a different relationship from the dog's perspective. For example, while one three element triple 600 can indicate that Bob likes the dog, another three element triple 600 may indicate that the dog does not like Bob.

In other embodiments a three element triple 600 can comprise one object 602 and two relations 604. These types of three element triples 600 can be considered secondary triples 600 in natural language processing, while three element triples 600 with two objects 602 and one relation 604 can be considered primary triples 600. By way of a non-limiting example, a primary triple can represent "I saw man" with objects 602 representing "I" and "man" and the relation 604 representing "saw," while a secondary triple linked to the "saw" relation 604 in the primary triple can represent "saw with telescope," with relations 604 representing "saw" and "with" and an object 602 representing "telescope." In some embodiments relations 604 representing verbs such as "with" can be modeled using partial recursive functions, and as such secondary triples 600 may be limited to partial recursive functions in some embodiments.

Returning to FIG. 6B, a two element triple 600 can comprise one object 602 and one relation 604. Accordingly, in some cases a two element triple's relation 604 can identify a particular function that can be applied to the triple's object 602.

In some embodiments a value associated with an object 602 or relation 604 can be encoded using the true, false, defined, or undefined truth values described above with respect to the four-valued logic system 118. By way of a non-limiting example, a truth value of T in a "like" relation 604 can indicate that a subject object 602 romantically likes the other object 602 in the triple 600, a truth value of F in the "like" relation 604 can indicate that the subject object 602 romantically dislikes the other object 602 in the triple 600, a truth value of D in the "like" relation 604 can indicate that the subject object 602 has romantic feelings of the other object 602 in the triple 600 and may romantically like or romantically dislike it, and a truth value of U in the "like" relation 604 may indicate that the property is romantically like is immaterial in the relation.

As described above, a relation 604 can represent a function that can operate on one or more objects 602. Relations for three-element triples 600 can be either primitive recursive operations or general recursive operations, as they can take two objects 602 as operands. However, relations for two-element triples 600 may be restricted to primitive recursive operations that take one object 602 as an operand. By way of non-limiting examples, a relation 604 in a two-element triple 600 can be a successor function that increments a value by one, or a phrasal rewrite rule 120 that takes a single object 602 as an operand and checks if it is properly quantified.

In some embodiments the data structure of the triples 600 can represent a directed acyclic graph of the predicate calculus. The predicate calculus represented by the triples 600 can use the propositional calculus of the four-valued logic system 118 described above. The predicate calculus can implement both Classical and Intuitionistic deduction systems, utilizing both systems of deduction for contrasting and comparing mathematical theorems in the differing branches of logic.

Accordingly, propositions involving objects 602 and/or 606 can be tested and evaluated using the four-valued logic system 118. By way of a non-limiting example, a phrasal rewrite rule 120 and a particular input argument can be evaluated together using the four-valued logic system 118 to determine whether the phrasal rewrite rule 120 should be applied based on the input argument.

Figure 8:
FIG. 8 depicts a model of a phrasal rewrite rule.

FIG. 8 depicts a model of a phrasal rewrite rule 120. A phrasal rewrite rule 120 can have a left hand side (LHS) and a right hand side (RHS). The left hand side can accept an argument, such as a 2-element triple 600, a 3-element triple 600, an object 602, or a relation 604. The left hand side can have one unit that accepts the argument, while the right hand side can have one or more units. When the rule is applied, the units of the right hand side can be substituted for the single unit on the left hand side. Units in the substituted right hand side can inherit elements of the input argument as their arguments, such that each unit on the right hand side can be evaluated based on that argument using the left hand side of a different corresponding phrasal rewrite rule 120. In some phrasal rewrite rules 120, units in the substituted right hand side can inherit elements of the left hand side's argument for vertical transmission of feature inheritance in the grammar. By way of a non-limiting example, in the example phrasal rewrite rules 120 shown in FIGS. 10 and 11, units on the right hand side that are prefixed with an asterisk can indicate units that inherit elements of the input argument.

In some embodiments the left hand side of a phrasal rewrite rule 120 can be stored as a relation 604 in the semantic network 116, while the argument to be evaluated by the phrasal rewrite rule 120 can be represented by an object 602 in the semantic network 116, such as an object 602 standing alone or an object 602 that points to a particular 2-element or 3-element triple 600. Accordingly, a 2-element triple 600 can express a potential application of a phrasal rewrite rule 120, wherein the triple's relation 604 indicates the phrasal rewrite rule 120 and the triple's object 602 indicates the argument to be evaluated by the phrasal rewrite rule 120. The potential application of the phrasal rewrite rule 120 can thus be evaluated using the four-valued logic system 118 to determine if the phrasal rewrite rule 120 should actually be applied. By implementing the phrasal rewrite rules 120 with the four-valued logic system 118 in a semantic network 116 in which truth values are stored in parallel memory structures 700, the phrasal rewrite rules 120 can constructively model duality for computing analogies.

Figure 9:
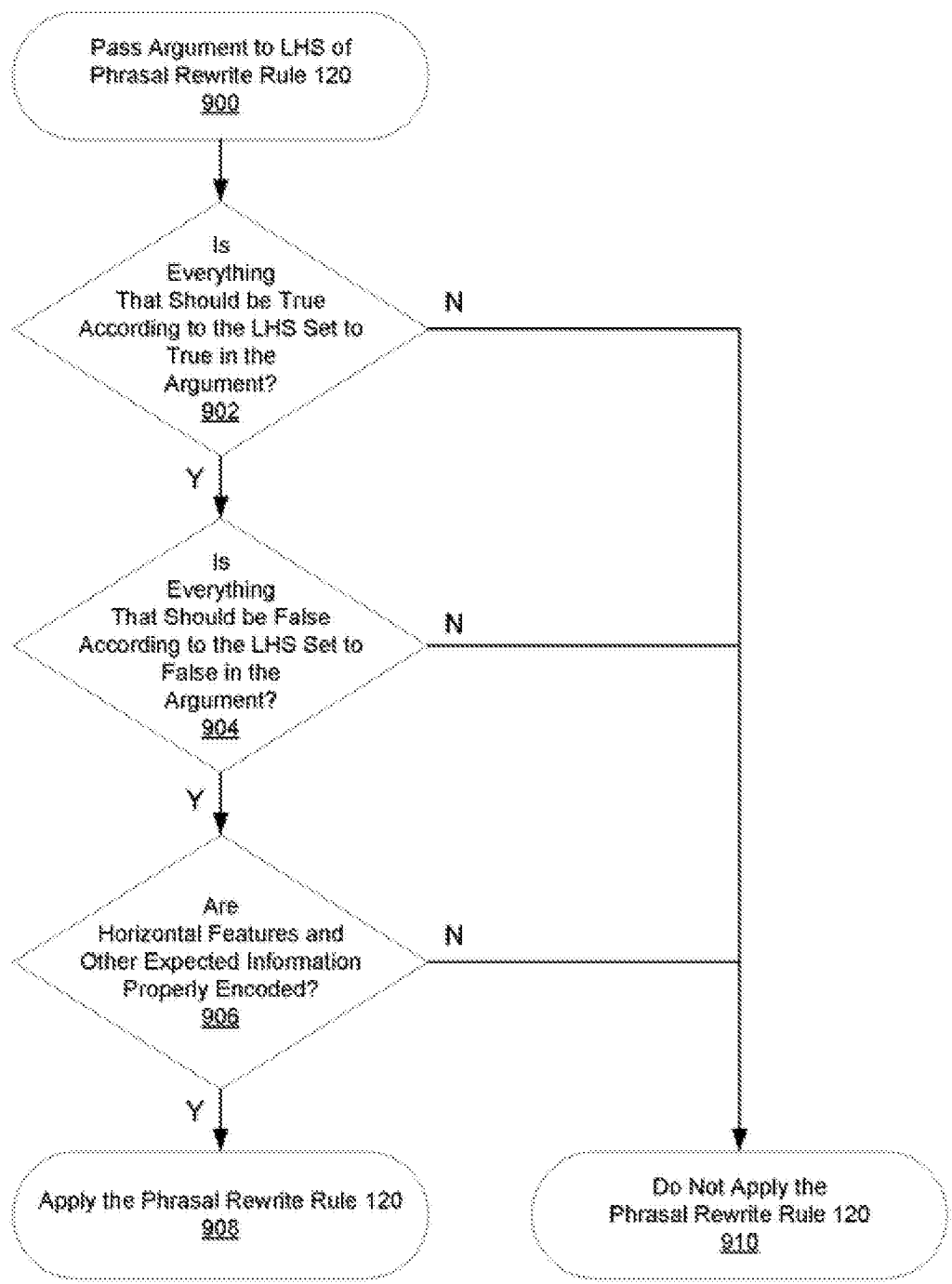
FIG. 9 depicts a method of evaluating the left hand side of a phrasal rewrite rule based on a particular argument to determine whether the phrasal rewrite rule should be applied.

FIG. 9 depicts a method of evaluating the left hand side of a phrasal rewrite rule 120 based on a particular argument to determine whether the phrasal rewrite rule 120 should be applied. Evaluation of a rule according to the process of FIG. 9 can be performed in constant O(C), or simply time O(1) if the chunking factor imposed by computer's word size is ignored. In some embodiments the process of FIG. 9 can be performed by determining whether bit values in single memory array 700 associated with the arguments in the semantic network 116 are properly quantified.

At step 900, an argument can be passed to the left hand side of a phrasal rewrite rule 120. The argument can be a 2-element triple 600, a 3-element triple 600, or an individual object or relation. Some phrasal rewrite rules 120 can expect particular types of arguments.

At step 902, the language learning system 100 can evaluate the argument to determine whether everything expected to be set to true by the left hand side is set to true in the argument's single memory array 700. If it is, the language learning system 100 can move to step 904. If it is not, the language learning system 100 can move to step 910 and determine that the phrasal rewrite rule 120 will not be applied.

At step 904, the language learning system 100 can evaluate the argument to determine whether everything expected to be set to false by the left hand side is set to false in the argument's single memory array 700. If it is, the language learning system 100 can move to step 906. If it is not, the language learning system 100 can move to step 910 and determine that the phrasal rewrite rule 120 will not be applied.

At step 906, the language learning system 100 can evaluate whether horizontal features, scalar values, and/or probabilistic information and other types of information expected by the left hand side are properly quantified in the propositional calculus in the argument's single memory array 700. Such information can be encoded as defined truth values in the four-value logic system 118. If the expected features are properly encoded, the language learning system 100 can move to step 908 and apply the phrasal rewrite rule 120. If they are not, the language learning system 100 can move to step 910 and determine that the phrasal rewrite rule 120 will not be applied.

At step 908, if the argument's truth values matches the criteria expected by the left hand side, the language learning system 100 can apply the phrasal rewrite rule 120 by replacing the left hand side's single unit for the one or more units of the right hand side. The units of the right hand side can inherit some or all of the elements of the argument originally passed to the left hand side. By way of a non-limiting example, when the left hand side accepts a 2-element triple 600 and the right hand side has two units, the argument triple 600 can be broken up and the object 602 can be used as an argument to the right hand side's first unit, while the relation 604 can be used as an argument to the right hand side's second unit. By way of another non-limiting example, when the left hand side accepts a 3-element triple 600 and the right hand side has two units, the argument triple 600 can be broken up and the argument's first object 602 can be used as an argument to the right hand side's first unit, while the argument's relation 604 and second object 602 can be used as an argument to the right hand side's second unit. As will be described in more detail below, in some phrasal rewrite rules features of specified inherited arguments on the right hand side can also be distributed among other arguments on the right hand side.

In some embodiments the blackboard 106 can have a list of phrasal rewrite rules 120. The language learning system 100 can evaluate a proposition starting with one phrasal rewrite rule 120 at the top of the list, then move to other phrasal rewrite rules 120 as appropriate based on whether earlier ones were applied and/or whether units on the left hand side of earlier-applied rules were broken into other units on the right hand side.

FIGS. 10-11 depict an exemplary embodiment of a list of phrasal rewrite rules 120 that can be used to generate a sentence in the target language based on an input argument triple 600. This list is only exemplary, as some embodiments of the language learning system 100 can use many more phrasal rewrite rules 120 and/or different phrasal rewrite rules 120. FIG. 10 depicts substitution of a left hand side with a right hand side of each phrasal rewrite rule 120, while FIG. 11 depicts horizontal feature inheritance within the right hand side of each phrasal rewrite rule 120.

Phrasal rewrite rules 120 can be used to generate a sentence that can be expressed to students during the interactive story, such as a sentence that describes the current state of an object 602, relation 604, or triple 600 in the semantic network 112 and/or neural network 119 as the interactive story is modeled. In some embodiments, the words used to generate a sentence come from a neural network trained from text selected from the text analyzer 208 after it has searched other databases and selected text for training using the vocabulary ratio C 1301 from the Random Petitioning Function as a test of the degree of similarity in the semantic universe.

FIG. 10 expresses each phrasal rewrite rule in terms of syntactic units. Syntactic units can represent a starting rule or specific grammar types. By way of non-limiting examples, "S" can indicate a starting rule, "N" can indicate a noun or noun phrase, "V" can indicate a verb or verb phrase, "Prep" can indicate a preposition or prepositional phrase, "Det" can indicate a determinant. By way of a non-limiting example, Rule 1 shown in FIG. 10 is a starting rule that results in noun and verb units on the right hand side. The right hand side's noun and verb units each inherit as an argument a designated portion of the triple 600 passed as an argument to the starting rule's left hand side. In FIG. 10, such inheritances are indicated next to the right hand side of each rule after "//" marks, and lines connect right hand side units to the type of element they inherit from the argument. By way of a non-limiting example, in FIG. 10's Rule 1 the noun unit on the right hand side can inherit an object 602 ("O") from the input argument while the verb unit inherits a relation 604 ("R") from the input argument. The noun unit and its argument can then be evaluated using other rules that have a noun as its left hand side unit, such as Rule 2. Similarly, the verb unit and its argument can be evaluated using other rules that have a verb as its left hand side unit, such as Rule 4.

In some embodiments, units on the right hand side of a phrasal rewrite rule 120 can indicate that features of the argument inherited by that unit are to be distributed among other units on the right hand side. By way of a non-limiting example, an asterisk preceding a syntactic unit in FIG. 10 indicates the vertical inheritance of features from the left hand side that will be distributed among other arguments on the right hand side. Features can be attributes of the input argument, such as an indication that an input object 602 is: singular or plural; is animate; is human; should be expressed with or without a determiner or specifier; or any other attribute. Accordingly, when features of an input argument triple 600 are inherited and distributed among the arguments to units on a rule's right hand side, words to express those syntactic units can be selected from the vocabulary list 122 such that they agree with each other with respect to the distributed features. By way of a non-limiting example, when an initial argument includes a plural object 602, the plurality of the object 602 can be maintained throughout the process via inherited distributed features, such that the final words used to express the state of the object 602 in the generated sentence consistently indicate that the object 602 is plural.

FIG. 11 depicts examples of horizontal feature distribution among units on the right hand side of various exemplary phrasal rewrite rules 120. By way of a non-limiting example, as shown by Rule 1, when an input argument to a starting "S" rule is a 2-element triple 600 in which the object 602 is plural, that object 602 can be inherited by the "NP" unit on the right hand side of the rule. The "VP" can inherit the argument's relation 604 as shown by Rule 1 in FIG. 10. However, because the "NP" unit is preceded by an asterisk, the features of the "NP" unit's inherited arguments can also be distributed to the "VP" unit's argument as shown in FIG. 11, thereby marking the "VP" unit's relation 604 with a plural feature. Accordingly, the language learning system 100 can take that feature into account when selecting a word to express the relation 604, such that the word selected for the verb matches the associated object's plural nature. As such, distributing such features after inheritance can allow for long distance dependencies in phrase structure grammars. The existence of such features can be ensured by testing for defined truth values when determining whether or not to apply a phrasal rewrite rule.

In some embodiments, subscripts or another notation associated with each syntactic unit in the phrasal rewrite rules 120 can indicate a priority level. The language learning system 100 can attempt to apply higher priority phrasal rewrite rules 120 first. If a phrasal rewrite rule 120 is found not to apply to its input argument, the language learning system 100 can move to a lower priority phrasal rewrite rule 120 to determine if that applies to the argument instead.

In some embodiments the language learning system 100 can use a stack data structure in the blackboard 106 when evaluating phrasal rewrite rules 120 to generate a sentence. By way of a non-limiting example, the blackboard 106 can first push an "S" unit to the stack when generating a sentence for an input triple 600. When an "S" rule is found to apply to the input triple 600, the "S" can be popped from the stack and the syntactic units on the right hand side can be pushed to the stack, such as the "NP" and "VP" units from Rule 1 shown in FIG. 10. The "NP" can be popped from the stack and evaluated similarly using rules with "NP" on their left hand side, with replacement units from an applicable right hand side being pushed to the stack. When no further phrasal rewrite rules 120 can be applied to a popped unit, a word matching the grammar type of that syntactic unit can be selected from the vocabulary list 122 and added to an output sentence. Features, such as singular, plural, animate, human, or other features that have been inherited by syntactic units can be taken into account to select an appropriate word with the inherited features. The language learning system 100 can then move to the next unit on the stack. When the stack is empty, the generated sentence can be complete. The text of the generated sentence can be displayed visually to a user via output components 104, and/or corresponding audio can be generated with the audio generation module 204 and audio assets 202 to be played back via output components 104.

Figure 12:
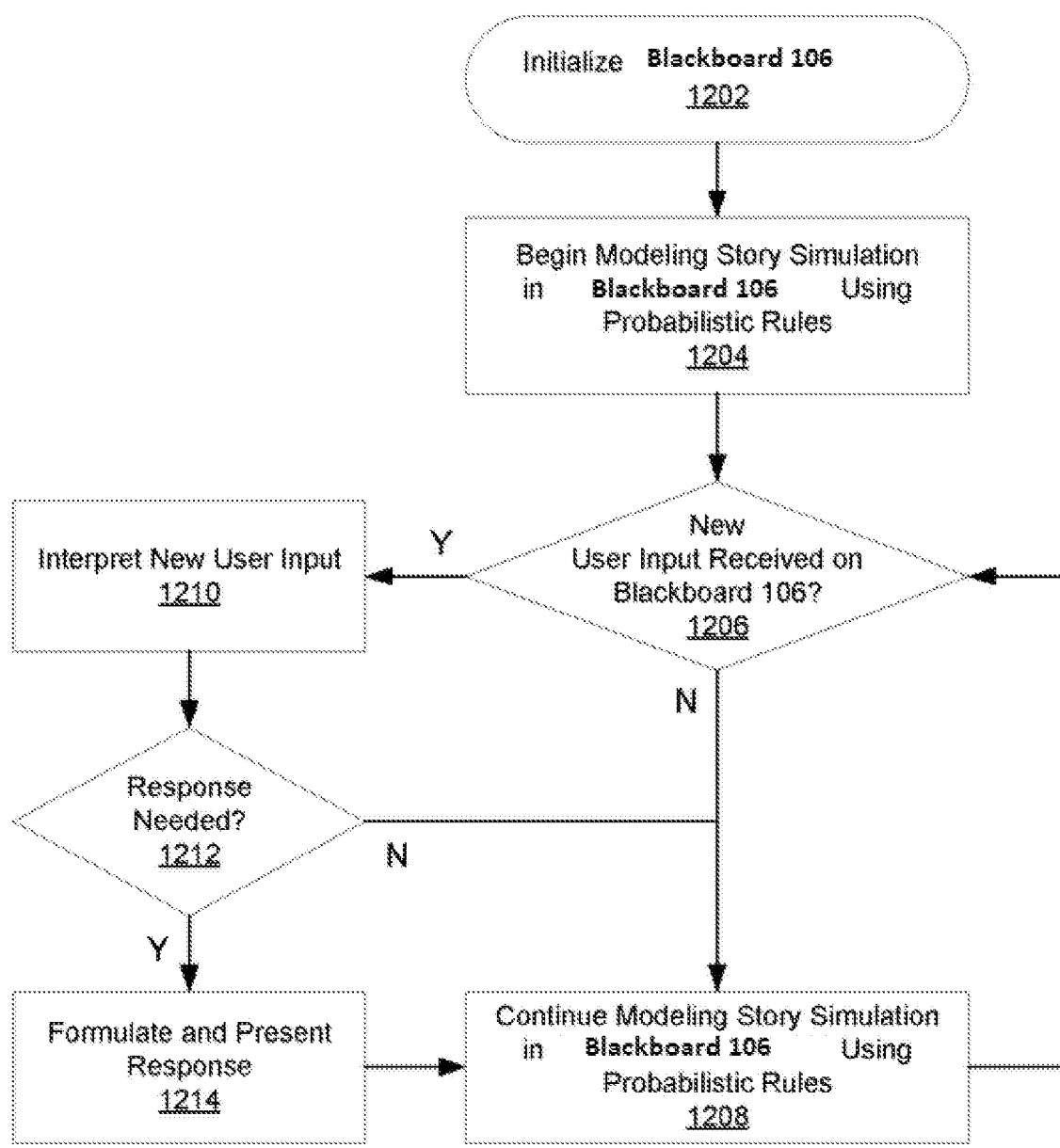
FIG. 12 depicts a process for modeling the state of an interactive story with the language learning system.

FIG. 12 depicts a process for modeling the state of an interactive story with the language learning system 100. As mentioned above, the blackboard 106 consisting of the semantic network 116 and/or neural network 119 can model the state of an interactive story, and audio and/or visuals representing the current state of the story can be presented to users via output components 104 as the story progresses.

At step 1202, the language learning system 100 can be initialized with data in the blackboard 106 and/or semantic network 116 and/or neural network 119 and/or phrasal rewrite rules 120 that use the four-valued logic system 118. The semantic network 116 and/or neural network 119 can also be initialized with objects 602 and relations 604 that represent story characters, items, settings, relationships, and/or other story elements.

In some embodiments the objects 602 and/or relations 604 for story elements can be initialized according to a preset initial state, or according to one of a plurality of possible preset initial states. In other embodiments at least some aspects of the objects 602 and/or relations 604 can be randomized or selected dynamically. By way of a non-limiting example, in some embodiments the names of characters, items, and other story elements can be randomly selected from a preset list and/or a vocabulary list 122 generated by the text analyzer 208 from text sources as shown in FIG. 3.

The blackboard 106 can also be initialized with probabilistic rules that, given a known state in the semantic network 116, define odds of the state of one or more objects and/or relations 604 changing or staying the same. By way of a non-limiting example, a rule can be defined in the semantic network 116 that indicates that a particular character in the story simulation will pick up a certain item 50% of the time when the character is considered to be near the item in the simulation and is not already holding the item in the simulation.

At step 1204, the language learning system 100 can begin the story simulation. Beginning with the initial story state, the language learning system 100 can evaluate the set of probabilistic rules to change the state of the story. By way of a non-limiting example, when the probabilistic rule described above is evaluated and the state of the semantic network 116 indicates that it is true in the simulation that the character's location is near the item's location and the character is not already holding the item, the rule can be applied such that 50% of the time a relation 604 between the character object 602 and the item object 602 in a 3-element triple 600 changes to indicate that the character is now holding the item.

When the semantic network 116 is initialized and updated in the blackboard 106, knowledge sources 114 can access the state of the objects 602 and relations 604 such that output audio and/or visuals can be generated and presented to users via output components 104. By way of a non-limiting example, the visual generation module 212 can instruct the graphics processor 112 to use appropriate visual assets 210 to render images that show the characters, items, or other story elements in the current state modeled by the semantic network 116, and those images can be displayed via a 3D projector or other output component 104. Similarly, the audio generation module 204 can instruct the audio processor 110 to use appropriate audio assets 202 to generate audio that can be played back via speakers. By way of a non-limiting example, as story characters interact with each other or with items in the story simulation, dialog or narration that express the state of the story can be generated according to the phrasal rewrite rules 120 described above, such that the user reads and/or hears words in the target language that correspond to the ongoing story.

At step 1206, the language learning system 100 can check the blackboard 106 to determine if any user input has been received via input components and added to the blackboard 106. If no user input has been received, the language learning system 100 can move to step 1208 and continue modeling the story according to the probabilistic rules described above, thereafter returning to step 1206 to check for new user input. If user input is detected at step 1206, the language learning system 100 can move to step 1210.

At step 1210, the language learning system 100 can interpret the new user input added to the blackboard 106. When the new user input is a voice recording of a user's question or statement, the control module 108 can activate the language recognition module 206 to interpret the recorded voice. The control module 108 can similarly activate the visual recognition module 214 to identify a location on generated visuals that a user is pointing to in conjunction with the recorded statement or question.

At step 1212, the language learning system 100 can determine whether a response should be presented to the user in response to the new user input. When no response is needed, the language learning system 100 can move directly to step 1208 to continue modeling the story simulation. By way of a non-limiting example, when the user input is a statement unrelated to the story, the user input can be ignored and the language learning system 100 continue modeling the story simulation without a response. However, when the language learning system 100 determines that the user's input is a question or statement to which it can respond, the language learning system 100 can move to step 1214 to formulate and present a response. In some embodiments, when the language learning system 100 is unable to determine what the user's question or statement refers to, the language learning system 100 can generate a question using phrasal rewrite rules 120 to ask the user for more information.

At step 1214, when the user input is a question, the language learning system 100 can attempt to respond to the user's question. By way of a non-limiting example, when visuals depicting the current state of the story show a character smelling a flower and the input components capture the user asking "What's that?" while pointing to the flower, the language learning system 100 can recognize the question, identify that the user is pointing to the portion of generated visuals that represent a flower object 602 in the semantic network. The language learning system 100 can then use phrasal rewrite rules to generate a sentence that indicates that the item is a flower, and play back corresponding audio that says "That's a flower." Because the objects 602 in the semantic network can be generated and/or named dynamically based on a vocabulary list 122 from text sources, the user can learn new words in a target language from the vocabulary list 122 by interacting with the story and asking questions about what they see and hear. In some embodiments the language learning system 100 can pause the story simulation and story presentation while formulating and presenting a response. After the response has been presented, the language learning system 100 can move to step 1208 to continue modeling the story simulation.

At step 1214, when the user input is a statement that pertains to the current state of the story, in some embodiments the language learning system 100 can note the statement but continue to step 1208 to continue modeling the story simulation without directly responding to the user. By way of a non-limiting example, when the user points to a story item in the generated visuals and says "That's pretty," the language learning system 100 can note the user's preference for the item in an associated object 602 in the semantic network 116. Such preferences can be used in conjunction with probabilistic rules such that preferred objects 602 can be more likely to appear again during the interactive story or have favorable treatment relative to other objects 602 in the simulation.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

REFERENCES

The references listed below are hereby incorporated by reference:

Good, I. J. "Studies in the History of Probability and Statistics. XXXVII A. M. Turing's statistical work in World War II". *Biometrika*. Vol. 66 No. 2. 1979. pp. 393-396.

Good, I. J. "Statistics of Language". *Encyclopaedia Of Linguistics, Information and Control*. Meetham, A. R. and R. A. Hudson, Editors. New York: Pergamon Press, 1969.

Herdan, G. *The Advanced Theory of Language as Choice or Chance*. New York: Springer-Verlag, 1966.

Herdan, G. *Quantitative Linguistics*. Belfast: Butterworth & Co., 1964.

Kleene, S. *Metamathematics*. New York: American Elsevier Publishing Co., 1974.

Kleene, S. *Mathematical Logic*. New York: Dover Publications, 2002.

Klein, S. "Automatic Paraphrasing in Essay Format". *Mechanical Translations and Computationa Linguistics*. 8: 68-83.

Klein, S. "FORWARD: The History of MESSY". In *The Meta-symbolic Simulation System User Manual*, M. A. Applebaum. UWCS Tech. Report #272, 169 pages.

Klein, S., Aeschliman, Applebaum, Balsisger, Curtis, Foster, Kalish, Kamin, Lee & Price. "Simulation d'hypotheses emises par Propp et Levi-Strauss en utilisant un systeme de simulation meta-symbolique". *Informatique et Sciences Humaines*, No. 28, pp. 63-133. Mars.

Klein, S. "The Analogical Foundations of Creativity in Language, Culture & the Arts: The Upper Paleolithic to 2100 CE." In *Language, Vision & Music*, edited by McKevitt, Mulvihill & Nuallin, Amsterdam: John Benjamin, pp. 347-371.

Steedman, M. "Categorial Grammar". *University of Pennsylvania Department of Computer and Information Science Technical Report No. MS-CIS*-92-52. USA, 1992.

Yngve, V. *From Grammar to Science: New foundations for general linguistics*. Amsterdam: John Benjamins, 1996.

What is claimed is:

1. A language teaching process, comprising:
   a plurality of tuple elements, each tuple element comprising a plurality of sub-tuple elements;
   a semantic network modeling interactive avatars for dynamic, interactive story generation based on the plurality of tuple elements, wherein properties including truth values, dynamic variables, scalar values, and probabilistic weights associated with the plurality of tuple elements and sub-tuple elements are encoded using a propositional logic system in a dynamic bit vector memory array, the truth values of true, false, defined, and undefined are explicitly modeled with the initial values being manually set by the user using a data file and/or feature extraction programs,
   defining a set of phrasal rewrite rules that accept an input triple as an argument, the phrasal rewrite rules, when applied, generate syntactic units corresponding to a plurality of constituents and sub-constituents;
   applying a phrasal rewrite rule to an argument for top-down parsing when:
      properties quantified to be true by said phrasal rewrite rule are set to true in the dynamic bit vector memory array,
      properties quantified to be false by said phrasal rewrite rule are set to false in the dynamic bit vector memory array, and
      properties quantified to be defined by said phrasal rewrite rule are set to false in said associated dynamic bit vector memory array;
   wherein applying a phrasal rewrite rule for top-down parsing includes substituting the syntactic units of a phrasal rewrite rule's sub-constituents for its corresponding constituents;
   generating a sentence in a target language by selecting words from a vocabulary list according to the syntactic units;
   presenting said sentence textually and/or audibly and/or visually to a user; performing bottom-up parsing by:
   generating a set of sub-constituents from a sentence in a target language mapped textually and/or audibly and/or visually to a vocabulary list giving all possible syntactic sub-constituents combinations as input for parsing;
   substituting a particular constituent of a phrasal rewrite rule to one or more particular sub-constituents for bottom-up parsing when:
      properties quantified to be true in all the syntactic units in the sub-constituents under consideration are set to true in their associated dynamic bit set memory array, and
      properties quantified to be false in all the syntactic units in the sub-constituents under consideration are set to false in their associated dynamic bit set memory array, and
      properties quantified to be defined by said phrasal rewrite rules sub-constituents under consideration are either set to true or false in their associated dynamic bit set memory array, and
   creating a triple for the semantic network by substituting syntactic units from the constituent of a phrasal rewrite rule with the syntactic units from the sub-constituents.

2. The language teaching process of claim 1, wherein presenting said sentence further includes:
   displaying text or visuals on a monitor, virtual reality environment, or 3D projector that follows the dynamic story telling of the semantic network.

3. The language teaching process of claim 2, wherein:
   the dynamic story telling of the semantic network is based on user input, probabilistic methods, and/or neural networks.

4. The language teaching process of claim 1 wherein:
   encoding truth values associated with objects and/or relations are encoded using a two-bit vector indicating an encoded true value, an encoded false value, an encoded defined value, or an encoded undefined value.

5. The language teaching process of claim 1, wherein:
   determining whether or not a phrasal rewrite rule is applied in time 0 (N) is based upon the physical implementation computer word size in the conditional testing and quantification checks of truth values and variables encoded in the dynamic bit set memory array associated with the elements of the semantic network.

6. The language teaching process of claim 1, further comprising:
   using Good-Turing repeat rate for ranking the overall vocabulary diversity of texts to be used on input into the semantic network for the selection of new vocabulary to the user and
   using Herdan's vocabulary ratio C for the semantic ranking of texts for the selection of vocabulary in goal orientated learning for the user to be input into the semantic network; and
   using one or more random partitioning functions to select vocabulary ratios from the Good-Turing repeat rate and Herdan's C, to be presented to the user as the vocabulary list.

7. The language teaching process of claim 3, wherein inputting into the dynamic modeling of the semantic network comprises:
   receiving a voice recording of a user captured by a microphone;

recognizing spoken words in said recorded user input according to a Markov model or neural network;

determining a state of said interactive story relevant to the recognized spoken words;

generating a response to said spoken words using phrasal rewrite rules and the semantic network; and presenting said response to the user.

8. The language teaching process of claim 7, further comprising:

displaying visuals representing the state of said interactive story;

receiving an image of a user captured by a camera;

recognizing a gesture performed by the user in said image;

determining an area of interest of said visuals pointed to by the user's gesture, using area of interest to determine what object the user's spoken words referred to in said semantic network, and generating a response to said spoken words based on the determined object.

9. A semantic network, comprising:

a blackboard memory area for central control and command, the blackboard memory area storing data representing:

a four-valued logic system of true values, false values, defined values, and undefined values, the semantic network encoding the four valued propositional logic;

a list of phrasal rewrite rules;

avatar interactions; and a dynamic interactive story;

an audio generation module linked to said blackboard memory area, said audio generation module being configured to generate interactive dialogue for avatars and comprehensive story audio based on said phrasal rewrite rules that match the state of said interactive story and add said story audio to said blackboard memory area;

a speaker linked to said blackboard memory area, said speaker being configured to play said story audio from said blackboard memory area for a user;

a visual generation module linked to said blackboard memory area, said visual generation module being configured to render avatar dialogue and story visuals representing the state of said interactive story and add said story visuals to said blackboard memory area; and a display component linked to said blackboard memory area, said projector being configured to present said story visuals from said blackboard memory area for the user, wherein said semantic network models said interactive story through objects and relations, with associations between objects and relations being represented with 2-element triples having one object and one relation or 3-element triples having either two objects and one relation or one object and two relations, wherein the state of said interactive story is modeled over time through probabilistic rules that change the state of said objects and/or said relations, and wherein whether or not particular phrasal rewrite rules or logical conditional rules are applied based on a particular input triple is determined using said four-valued logic system.

10. The semantic network of claim 9, wherein said display is a 3D projector and/or virtual reality environment.

11. The semantic network of claim 9, wherein truth values associated with objects and/or relations are encoded using a single memory array, with the four values encoded using two bit positions in the dynamic bit vector array indicating an encoded true value, an encoded false value, an encoded defined value, or an encoded undefined value.

12. The semantic network of claim 9, wherein one or more of said phrasal rewrite rules are applied to a triple to generate a sentence in a target language that expresses the logical properties or action of the triple in said semantic network.

13. The semantic network of claim 12, wherein said phrasal rewrite rules, and new vocabulary words are selected and added to the running total of vocabulary used in the system from the different vocabulary connectivity classes, the ratio of new words to be added being given by the line of how vocabulary is growing in regards to the random partitioning function of the text selected for learning by the system, guiding user interaction towards a specific semantic domain also using the vocabulary ratio C and the Good-Turing repeat rate for appropriate domain and text selection; hereby presenting new vocabulary in an optimal fashion for selected texts to the user by creating a log text length/log vocabulary graph, selecting a starting point in the graph for the user from previous interactions with the system; and using the ratio's provided by classes created by the random partitioning function to select new vocabulary to presented and learned the user.

14. The semantic network of claim 9, further comprising:

a microphone linked to said blackboard memory area, said microphone being configured to add recorded user input to said blackboard memory area; and an audio recognition module linked to said blackboard memory area, said audio recognition module being configured to recognize spoken words in said recorded user input according to a Markov model or neural network and adds recognized words to said blackboard memory area.

15. The semantic network of claim 14, wherein said audio generation module uses said phrasal rewrite rules to generate a sentence in response to spoken words recognized in said recorded user input by said audio recognition module and adds the generated sentence to said blackboard memory area to played with said speaker.

16. The semantic network of claim 14, further comprising:

a camera linked to said blackboard memory area, said camera being configured to add images of the user to said blackboard memory area; and a visual recognition module linked to said blackboard memory area, said visual recognition module being configured to recognize gestures pointing to portions of said story visuals being displayed by said display component.

\* \* \* \* \*